United States Patent [19]

Rodda

[11] 4,316,212

[45] Feb. 16, 1982

[54] METHOD FOR ADJUSTING THE BIAS OF A KINESCOPE IN A COLOR TELEVISION RECEIVER AND APPARATUS TO FACILITATE SAME

[75] Inventor: William E. Rodda, Trenton, N.J.

[73] Assignee: RCA Corporation, New York, N.Y.

[21] Appl. No.: 190,596

[22] Filed: Sep. 25, 1980

[51] Int. Cl.³ .............................................. H04N 9/62
[52] U.S. Cl. .................................................... 358/10
[58] Field of Search ......................................... 358/10

[56] References Cited

U.S. PATENT DOCUMENTS

4,118,729 10/1978 Shanley ................................ 358/10

Primary Examiner—Richard Murray
Attorney, Agent, or Firm—Eugene M. Whitacre; Paul J. Rasmussen; Ronald H. Kurdyla

[57] ABSTRACT

A method and associated apparatus are disclosed for facilitating the service adjustment of the blanking current levels of a kinescope in a color television receiver, when video signals are decoupled from the kinescope and kinescope vertical scanning is disabled in a service operating mode of the receiver. In the service mode, a grid electrode of the kinescope is forward biased during a monitoring interval to produce a kinescope cathode output voltage proportional to the kinescope blanking current level. A sample of the cathode output voltage is compared with reference voltages for providing plural output signals representative of high, low and correct cathode blanking current levels relative to a desired current level. The output signals energize plural display devices for indicating whether the blanking current is high, low, or correct with respect to the desired current level. If necessary, the kinescope bias is adjusted until the display devices indicate that the desired blanking current level is obtained.

15 Claims, 7 Drawing Figures

METHOD FOR ADJUSTING THE BIAS OF A KINESCOPE IN A COLOR TELEVISION RECEIVER AND APPARATUS TO FACILITATE SAME

This invention concerns a method for adjusting the blanking current of a kinescope in a color television receiver in a service operating mode of the receiver, and apparatus to facilitate the bias adjustment.

A color image reproducing kinescope of a color television receiver comprises a plurality of electron guns each energized by red, green and blue color representative signals derived from a composite color television signal. Since a reproduced color image is defined by individual ones of these signals or a combination thereof, optimum reproduction of a color image requires that the relative proportions of these color signals be correct at all kinescope drive levels from white through gray to black, at which point the three electron guns should exhibit significantly reduced conduction or be cut off (i.e., blanked).

The optimum reproduction of a color picture and gray scale tracking of the kinescope can both the adversely affected when the bias of the electron guns varies from a desired level, causing unwanted kinescope blanking errors to be produced. These errors are visible as a color tint on a displayed monochrome picture, and also upset the color fidelity of a displayed color image. The blanking errors can be caused by a variety of factors, such as differences in the operating parameters among the kinescope electron guns and temperature effects, for example.

Since it is desirable to assure that the proportioning of the color signals to the kinescope is correct at all picture brightness levels, color television receivers commonly include provisions for adjusting the kinescope and associated circuits in a set-up or service operating mode of the receiver in accordance with well known procedures, as described in U.S. Pat. No. 4,118,729 of R. L. Shanley, II, for example. Briefly, a service switch with "normal" and "service" positions is operatively associated with the receiver signal processing circuits and the kinescope. In the "service" position, video signals are decoupled from the kinescope and vertical scan is collapsed so that the receiver is in a quiescent operating condition, and the kinescope displays a narrow horizontal line. The bias of each electron gun is then adjusted to establish a desired blanking current (e.g., a few microamperes) for each electron gun. Specifically, the bias of each electron gun is gradually controlled until each gun produces a barely visible, narrow horizontal line on the face of the kinescope. When all of the electron guns have been so energized, the line will appear, from a suitable distance, as a white line of low brightness level. This adjustment is intended to ensure that the kinescope is properly blanked in the absence of an applied video signal and in response to a black reference level of the video signal, and aslo to insure a proper proportion of color signals at all brightness levels. It is common practice to perform this adjustment as a factory adjustment during the manufacture of the receiver, as well as at other times over the life of the receiver as required.

The described service adjustment is often difficult to perform accurately and predictably on a reproducible basis because the "correct" brightness level of the narrow horizontal line associated with "correct" kinescope blanking bias is a function of subjective interpretation from one service technician to another, and is also a function of the viewing distance and ambient light levels, all of which can vary. Also, the degree of accuracy in the adjustment is limited by the time available to perform the adjustment and by the resolution of adjustable resistance devices that are typically employed to make the adjustments.

It is therefore desirable to minimize or eliminate the difficulties inherent in the kinescope blanking bias adjustment procedure noted above. One kinescope service system intended to eliminate the uncertainties and variations of visual judgment employs a light sensitive detector probe including a plurality of light sensitive diodes or similar devices secured to the face of the kinescope (e.g., by means of a suction device). The probe responds to the brightness level of the kinescope display for developing a signal that drives an indicator (such as a meter) to indicate the intensity of the display. With this system, however, the light sensitive probe devices typically are not sensitive enough to reliably provide an accurate indication of the intensity of the dim horizontal line displayed by the kinescope when the kinescope blanking current level is being adjusted.

The service method and associated apparatus disclosed herein serve to facilitate the accurate service adjustment of kinescope blanking current levels in a manner which eliminates the uncertainties and variations of visual judgment.

In accordance with the service method and apparatus according to the present invention, the electron gun of a kinescope in a television receiver is energized by means of a test signal, exclusive of video signals, during monitoring intervals when the receiver is in a service operating mode. The test signal causes the cathode of the kinescope to produce an output signal representative of the kinescope cathode current conduction level. A sample of the cathode output signal is compared with a reference signal to provide signals indicating the status of the cathode current conduction level as being less than, greater than, or substantially equal to a desired cathode current conduction level. The indicating signals are employed to provide a visual display of the status of the cathode current conduction level. If necessary, the kinescope bias is adjusted until a visual indication corresponding to the desired cathode current conduction level is obtained.

Figure 1:
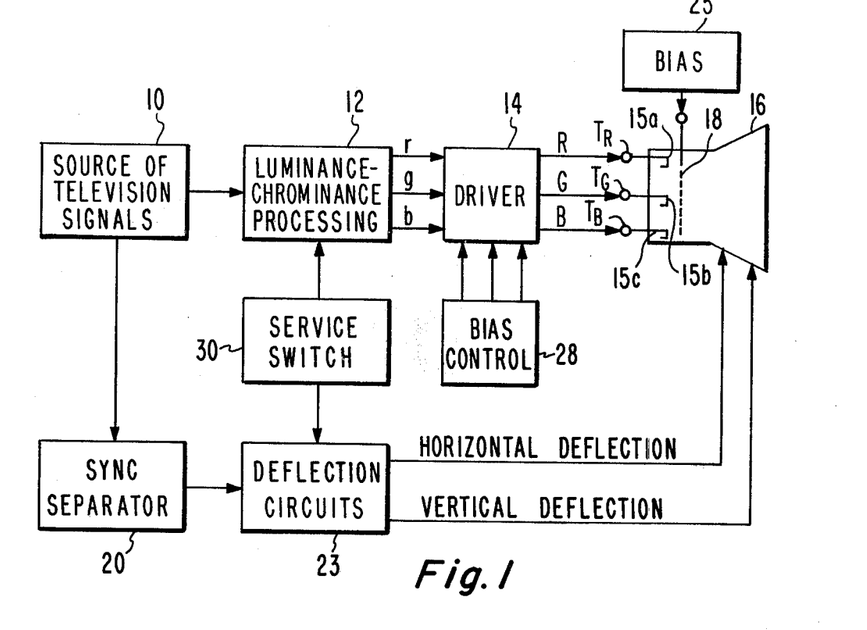
FIG. 1 shows a block diagram of a portion of a color television receiver.

In FIG. 1, signals from a source of television signals 10 are processed by a luminance-chrominance processor 12 to develop r, g, and b color image representative output signals. These signals are amplified by a kinescope driver stage 14 to provide high level R, G, B color signals suitable for driving intensity control cathode electrodes 15a, 15b and 15c of a color kinescope 16, via respective D.C. coupled cathode input terminals $T_R$, $T_G$ and $T_B$. In this example, kinescope 16 is of the self-converging in-line gun type with a commonly energized grid 18 associated with each of the electron guns comprising cathode electrodes 15a, 15b and 15c. Normal bias for grid 18 is provided by a bias source 25. A sync separator 20 separates the sync component from the television signal, and supplies the separated sync component to deflection circuits 23 for providing horizontal and vertical deflection signals for controlling the scanning of kinescope 16.

A bias control network 28 is associated with each of the individual red, green and blue video output amplifiers within driver 14. Adjustment of the bias voltages supplied by network 28 serves to vary the operating point and the D.C. output level of the red, green and blue signal video output amplifiers of driver 14. The cathode electrodes of kinescope 16 are biased in accordance with the D.C. output level of the video amplifiers in driver 14.

A service switch 30 with "normal" and "service" positions is coupled to control inputs of luminance-chrominance processor 12 and deflection circuits 23. As described in greater detail in U.S. Pat. No. 4,118,729 for example, the receiver operates normally in the "normal" position of switch 30, whereby received television signals are reproduced by kinescope 16. In the "service" position, the switch renders luminance-chrominance processor 12 inoperative to couple signals to kinescope 16, and vertical scanning of kinescope 16 is disabled to produce a narrow horizontal line on the face of the kinescope, to permit adjustment of the kinescope blanking current levels.

Figure 2:
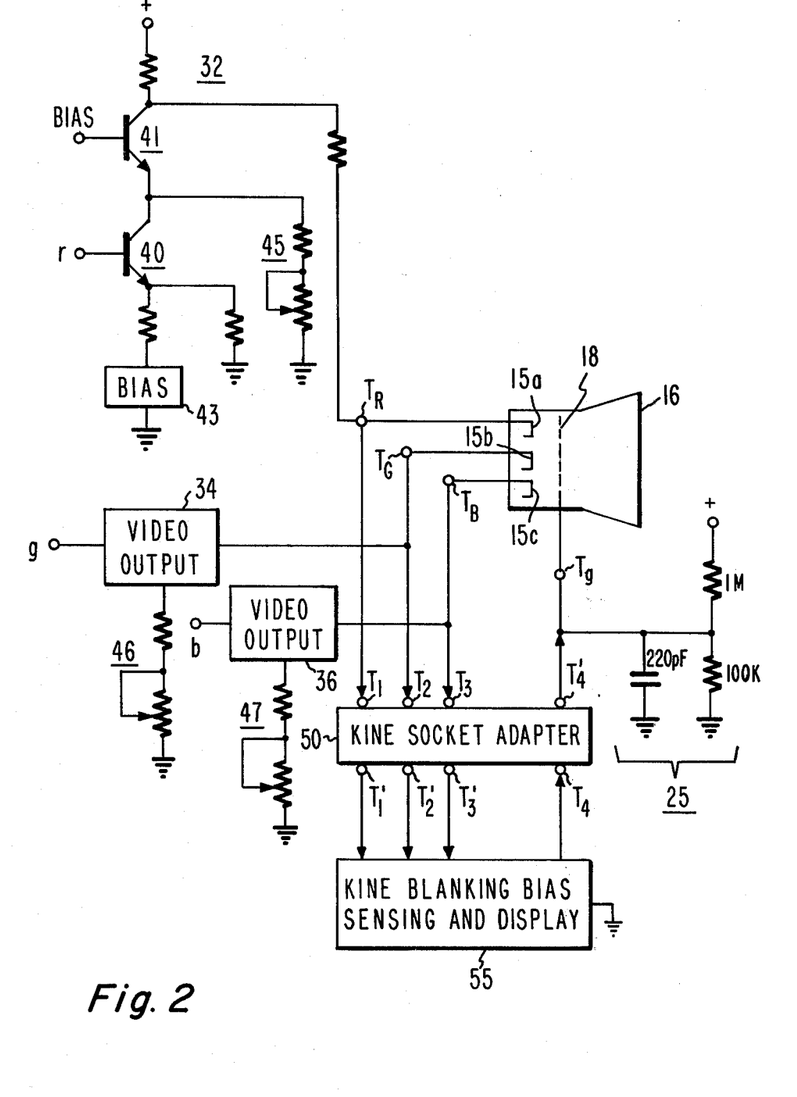
FIG. 2 is a diagram partly in block form and partly in schematic circuit form showing additional details of the arrangement of FIG. 1, including kinescope servicing apparatus according to the present invention.

Accurate kinescope blanking level adjustment is facilitated in the service mode by means of the arrangement shown in FIG. 2.

In FIG. 2, drive signals for kinescope cathodes 15a, 15b and 15c are supplied from similar video output amplifiers 32, 34 and 36, which comprise driver stage 14 in FIG. 1. Amplifier 32 is shown in detail and comprises a cascode arrangement of transistors 40 and 41 for amplifying the r color signal. Signal reference bias for amplifier 32 is provided from a source 43. The D.C. output levels of amplifiers 32, 34 and 36, and thereby the bias of associated kinescope cathode electrodes 15a, 15b and 15c, are respectively determined in accordance with the settings of adjustable bias control resistors 45, 46 and 47 included in unit 28 of FIG. 1.

In the service operating mode of the receiver when it is intended to adjust the blanking current levels of each of the kinescope electron guns comprising cathodes 15a, 15b and 15c, service switch 30 (FIG. 1) is set to the service position as discussed in connection with FIG. 1. In addition, a kinescope socket adaptor 50 is secured to the input socket of kinescope 16 with which kinescope cathode terminals $T_R$, $T_G$, $T_B$ and a grid terminal $T_g$ are associated.

Adaptor 50 comprises paired input-output connector terminals $T_1$—$T_1'$, $T_2$—$T_2'$, $T_3$—$T_3'$, and $T_4$—$T_4'$. Terminals $T_1$, $T_2$ and $T_3$ electrically contact cathode terminals $T_R$, $T_G$ and $T_B$. Terminal $T_4'$ electrically contacts grid terminal $T_g$. The red, green and blue signal kinescope cathodes 15a, 15b and 15c are individually coupled via terminals $T_1'$, $T_2'$ and $T_3'$ of adaptor 50 to separate inputs of a kinescope blanking bias sensing display unit 55. An output of unit 55 is coupled to kinescope grid terminal $T_g$ via terminals $T_4$ and $T_4'$ of adaptor 50.

Figure 7:
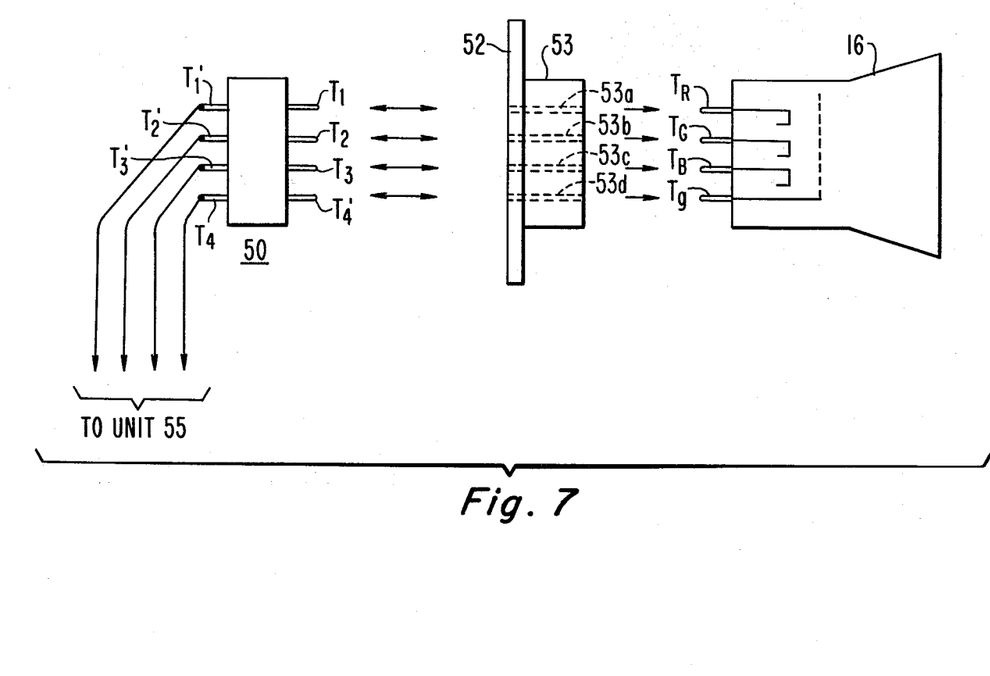
FIG. 7 shows a portion of the arrangement of FIG. 2 in greater detail.

FIG. 7 shows additional details of the manner in which adaptor 50 is connected to the kinescope. In FIG. 7, there is shown a side view of adaptor 50, a printed circuit board 52 and a kinescope socket 53. In this example, the video output amplifiers (32, 34 and 36 in FIG. 2) and the grid bias circuit (25 in FIG. 2) and associated circuitry are mounted on circuit board 52. The components mounted on circuit board 52 receive r, g, b signals from signal processor 12 and appropriate operating potentials via conductors (not shown) connected to inputs of circuit board 52. Kinescope socket 53 is formed of insulating material and is mounted on circuit board 52, and comprises a plurality of conductive (female) mating receptacles 53a–53d.

Receptacles 53a, 53b and 53c serve to couple the R, G, B video output signals from the video amplifiers on circuit board 52 to the red, green and blue signal cathodes of the kinescope when socket 53 is mated with kinescope cathode terminals $T_R$, $T_G$ and $T_B$. At the same time, receptacle 53d couples grid bias to kinescope grid terminal $T_g$. Adaptor 50 associated with service unit 55 is formed of insulating material and includes a plurality of (male) connecting terminals as discussed in connection with FIG. 2. Adaptor terminals $T_1'$, $T_2'$, $T_3'$ and $T_4$ are connected to service unit 55. Adaptor terminals $T_1$, $T_2$, $T_3$ and $T_4'$ respectively mate with receptacles 53a, 53b, 53c and 53d of socket 53 in the service mode when kinescope blanking bias is to be adjusted. Adaptor 50 is arranged for rapid attachment to and removal from the kinescope socket, without requiring modification of the kinescope drive circuits including circuit board 52 during service. Other configurations of adaptor 50 are possible, depending upon the accessability of the kinescope terminals and the configuration of socket 53.

Figure 3:
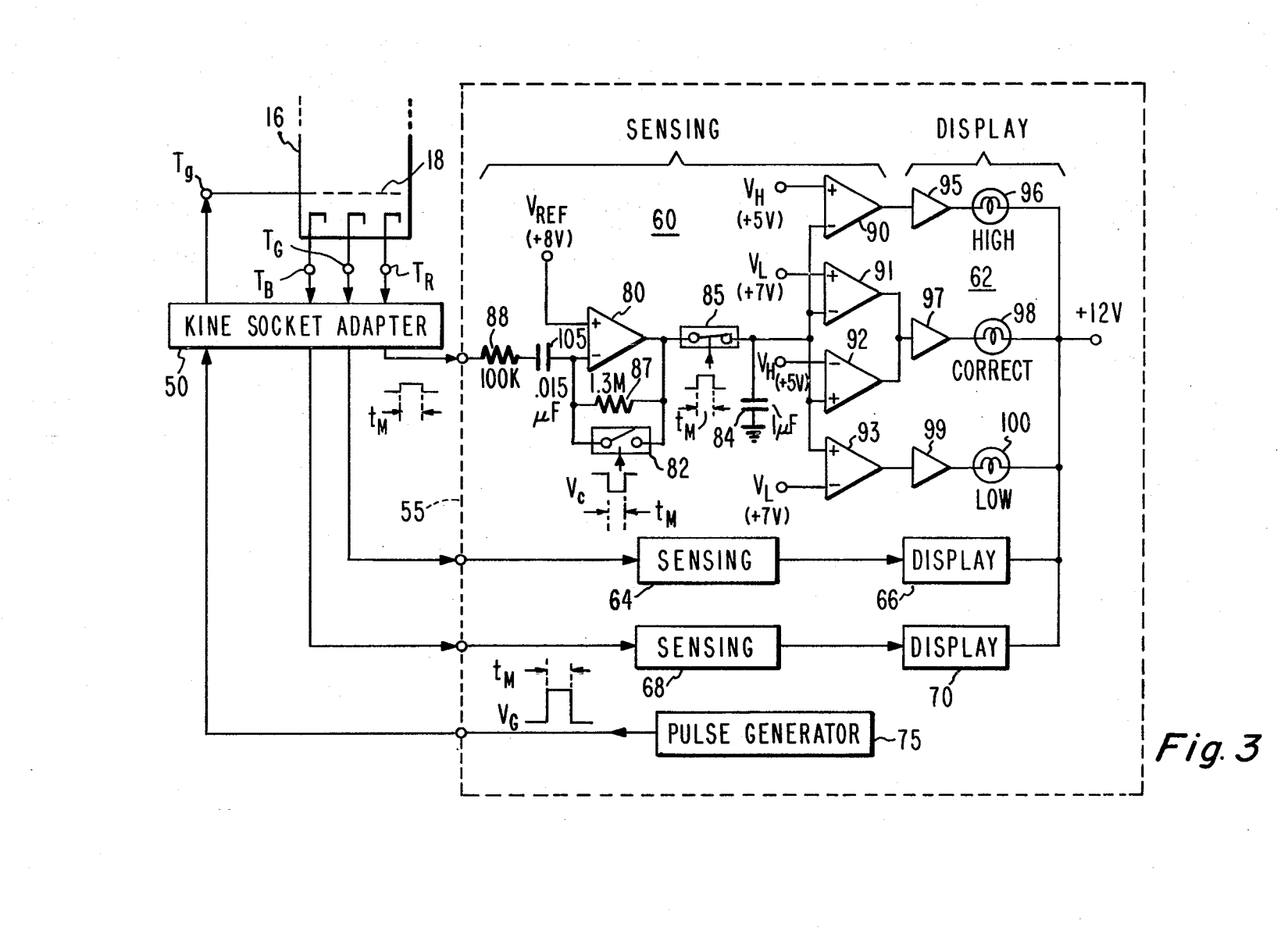
FIG. 3 is a diagram partly in block form and partly in schematic circuit form of kinescope servicing apparatus according to the invention.

Kinescope blanking current adjustment is performed in the service mode as discussed in connection with FIG. 3, which shows details of sensing and display unit 55. In FIG. 3, unit 55 comprises three similar sensing and display circuits each separately associated with one of the kinescope electron guns. Illustratively, a sensing circuit 60 and a display circuit 62 operate with respect to the kinescope electron gun comprising the red signal cathode. Sensing and display circuits 64, 66 associated with the green signal cathode, and sensing and display circuits 68, 70 associated with the blue signal cathode, are similar to and operate in the same manner as sensing and display circuits 60, 62. The following description with respect to the operation of sensing and display circuits 60, 62 for adjusting the blanking level bias of the red signal electron gun also applies to the operation of sensing and display circuits 64, 66 and 68, 70 for respectively setting the blanking level bias of the green and blue signal electron guns.

A pulse generator 75 in unit 55 develops a positive pulse $V_G$ of approximately 120 microseconds duration during a monitoring interval $t_M$ (corresponding to approximately two horizontal line intervals) at a 60 Hz rate (corresponding to the field scanning rate). It is not necessary to synchronize pulse $V_G$ with the line and field rates. Pulse $V_G$ is applied to grid electrode 18 via adaptor 50 and to terminal $T_G$ so as to forward bias grid 18. The kinescope red electron gun functions as a cathode follower in response to the grid pulse, wherein a similarly phased but attenuated version of the grid pulse appears at red cathode terminal $T_R$ during the monitoring interval. The amplitude of the output cathode pulse at terminal $T_R$ is proportional to the level of cathode (blanking) current conduction.

The cathode output pulse is processed by a sample and hold circuit comprising an inverting operational amplifier 80 with an associated bilateral switch 82 coupled between an output and an inverting (−) input of amplifier 80, and a peak detecting charge storage capacitor 84 coupled to the output of amplifier 80 via a sampling bilateral switch 85. The non-inverting (+) input of amplifier 80 is coupled to a source of reference voltage $V_{REF}$.

During monitoring interval $t_M$, switch 82 is rendered nonconductive (opened) in response to a negative-going timing pulse $V_C$, at which time the gain of amplifier 80 is determined by the ratio of the value of a feedback resistor 87 to the value of an input resistor 88. Also at this time, sampling switch 85 is rendered conductive (closed) in response to a positive-going timing pulse $V_S$ for coupling the output of amplifier 80 (comprising a version of the cathode output pulse developed in response to grid pulse $V_G$) to capacitor 84. A voltage sample developed on capacitor 84 is representative of the level of the cathode output pulse and therefore also represents the level of blanking current conducted by the red electron gun. This voltage sample is applied as an input to a voltage comparator array comprising comparators 90–93 each with inverting (−) and non-inverting (+) signal inputs.

The outputs of comparators 90 and 93 are respectively coupled to a display circuit comprising a lamp driver 95 and an associated indicator lamp 96, and a lamp driver 99 and an associated indicator lamp 100. The outputs of comparators 91 and 92 are coupled in common to a display circuit comprising a lamp driver 97 and an associated indicator lamp 98. Threshold reference voltages $V_H$ and $V_L$ are applied to reference inputs of comparators 90–93 as shown. The comparators are arranged so that each comparator will provide a high level output suitable for activating the associated display circuit whenever the level of potential appearing at an inverting input is less than the potential appearing at a non-inverting input (or conversely, whenever the non-inverting input potential exceeds the inverting input potential).

For purposes of the following example, it is assumed that a "correct" level of blanking current conduction for the red electron gun corresponds to a voltage sample of six volts developed on capacitor 84. In this instance the outputs of both comparators 91 and 92 will exhibit a high level for causing lamp 98 to illuminate, thereby clearly indicating that the red electron gun blanking current level (and thereby cathode bias voltage) is correct. The outputs of both comparators 91 and 92 must be at a high level for lamp 98 to be driven "on." If the blanking current level is too high, the cathode output pulse will exhibit a relatively greater amplitude. The output level of inverting amplifier 80 will be correspondingly reduced and thereby the charge on capacitor 84 will be correspondingly reduced (compared to the "correct" condition) to four volts, for example, by discharging via bilateral switch 85. In this instance only lamp 96 is caused to illuminate.

Analogous observations pertain for a condition of a low blanking current level, wherein the charge on capacitor 84 is caused to increase in proportion to the amount by which the blanking current level is below the desired correct level, and only lamp 100 illuminates. In this regard it is noted that the peak level of grid drive pulse $V_G$ is chosen so that a discernible cathode output pulse is produced (i.e., cathode follower action is produced) even when the cathode blanking current level is below the desired blanking level, within typically expected limits. Also, the peak level of grid drive pulse $V_G$ is chosen so that the expected levels of the induced cathode output pulse, as appearing at the inverting input of amplifier 80, do not exceed the level of $V_{REF}$ applied to the non-inverting input of amplifier 80.

The threshold reference limits set by voltages $V_H$ and $V_L$ applied to comparators 90–93 can be tailored to produce an "overlap" condition, wherein two adjacent lamps (i.e., 96, 98 and 98, 100) can be caused to illuminate simultaneously. This result is advantageous when the blanking level bias adjustment controls (e.g., variable resistors 45, 46, 47 in FIG. 2) exhibit low resolution, as is common in many receivers.

Conditions of high and low cathode blanking current levels are corrected by adjusting variable resistors 45, 46 and 47 associated with each video output cathode driver amplifier (FIG. 2). For example, resistor 45 is adjusted until the D.C. output level of transistor 41, and thereby the bias of red signal cathode 15a, exhibits a level sufficient to produce a correct blanking current level for the red electron gun, as will be indicated by display circuit 62 of unit 55. In this example, increasing and decreasing the voltage at cathode 15a serves to respectively decrease and increase cathode current conduction. After the cathode current blanking levels have been set for all three electron guns, adaptor 50 is removed from the kinescope and the service switch is returned to the "normal" position.

With regard to sensing circuit 60 in FIG. 3, it is noted that switch 82 is conductive (closed) and switch 85 is nonconductive (open) at times other than monitoring interval $t_M$. During such times the inverting input of amplifier 80 is clamped to the output level of amplifier 80, which is then at $V_{REF}$ potential, in cooperation with an input clamping capacitor 105. During the cathode pulse monitoring interval $t_M$, capacitor 84 develops a voltage proportional to the difference between input clamping level $V_{REF}$ and the peak level of the cathode output pulse that is superimposed on the clamping level. This input clamping arrangement of amplifier 80, clamping switch 82 and clamping capacitor 105 is particularly advantageous in a system for sensing low level signals such as that disclosed, since with this clamping arrangement voltage offsets at the inputs of amplifier 80 and input switch offsets are prevented from being amplified by amplifier 80. Amplifier output errors are therefore reduced significantly.

Figure 4:
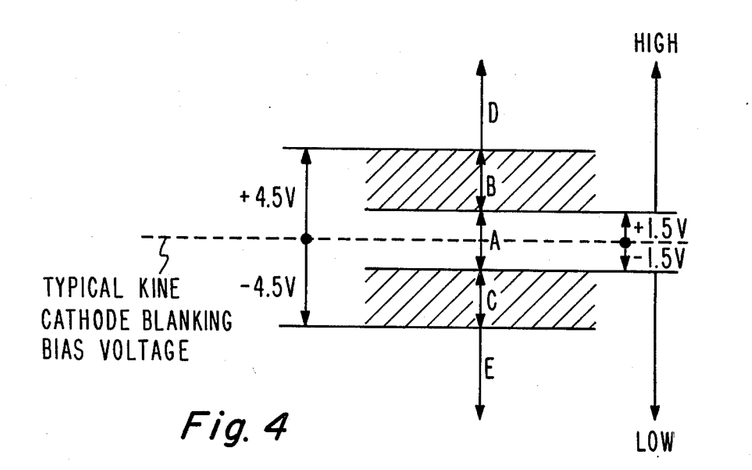
FIG. 4 is a diagram helpful in understanding the operation of the apparatus shown in FIG. 3.

The diagram of FIG. 4 illustrates the operation of indicator lamps 96, 98, 100 (FIG. 3) with respect to typical high, low, and correct levels of a kinescope cathode blanking level bias voltage as set by bias control resistors 45, 46 and 47 (FIG. 2). Ranges A, B and C indicate ranges of "correct" or acceptable cathode blanking voltages with respect to a typical cathode blanking bias voltage (e.g., a few hundred volts). Lamp 98 alone illuminates over range A. Shaded ranges B and C correspond to acceptable but relatively higher and lower ranges of cathode blanking voltage, respectively associated with acceptable but relatively low and high blanking current levels. Lamps 98 and 100 will both illuminate over range B, and lamps 96 and 98 will both illuminate over range C. With regard to ranges B and C, it is noted that is preferable to adjust kinescope bias until "correct" lamp 98 alone illuminates. This may be difficult to accomplish with some receivers, however, wherein the bias adjustment controls exhibit low resolution. In such case, a bias setting wherein both lamps 98, 100 or 96, 98 illuminate would be considered as an acceptable kinescope bias setting condition. Ranges D and E correspond to unacceptable ranges of cathode blanking current. Lamp 100 alone illuminates over range D, and lamp 96 alone illuminates over range E.

Figure 5:
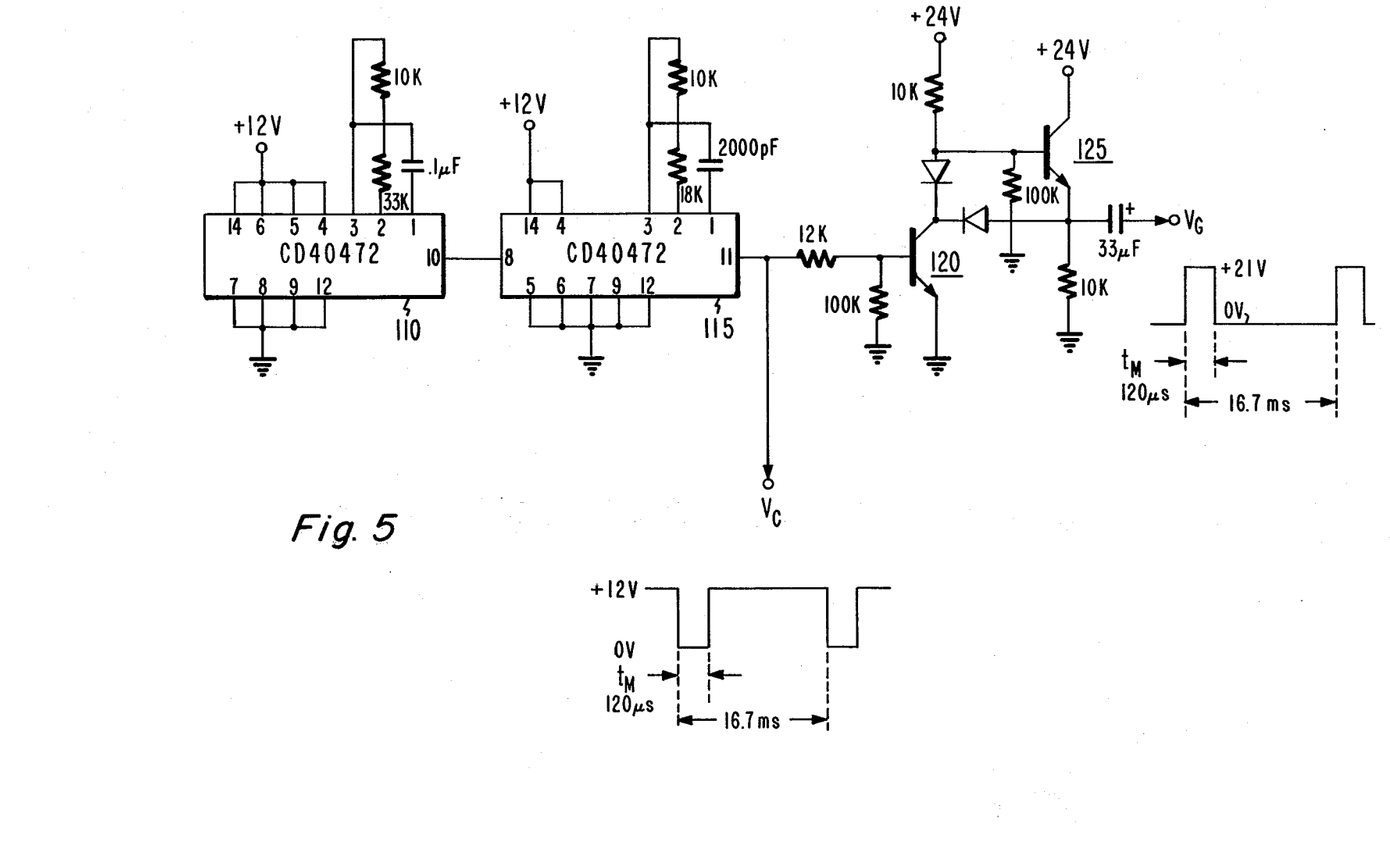
FIG. 5 is a diagram of a circuit used in conjunction with the arrangement shown in FIG. 3.

FIG. 5 shows a circuit suitable for generating signals $V_C$ and $V_G$ for use by the arrangement of FIG. 3. The circuit of FIG. 5 comprises bistable multivibrators 110 and 115 and transistors 120 and 125 arranged as shown. Signal $V_C$ is provided from the output of multivibrator 115, and grid pulse signal $V_G$ is provided from the emitter circuit of transistor 124.

Figure 6:
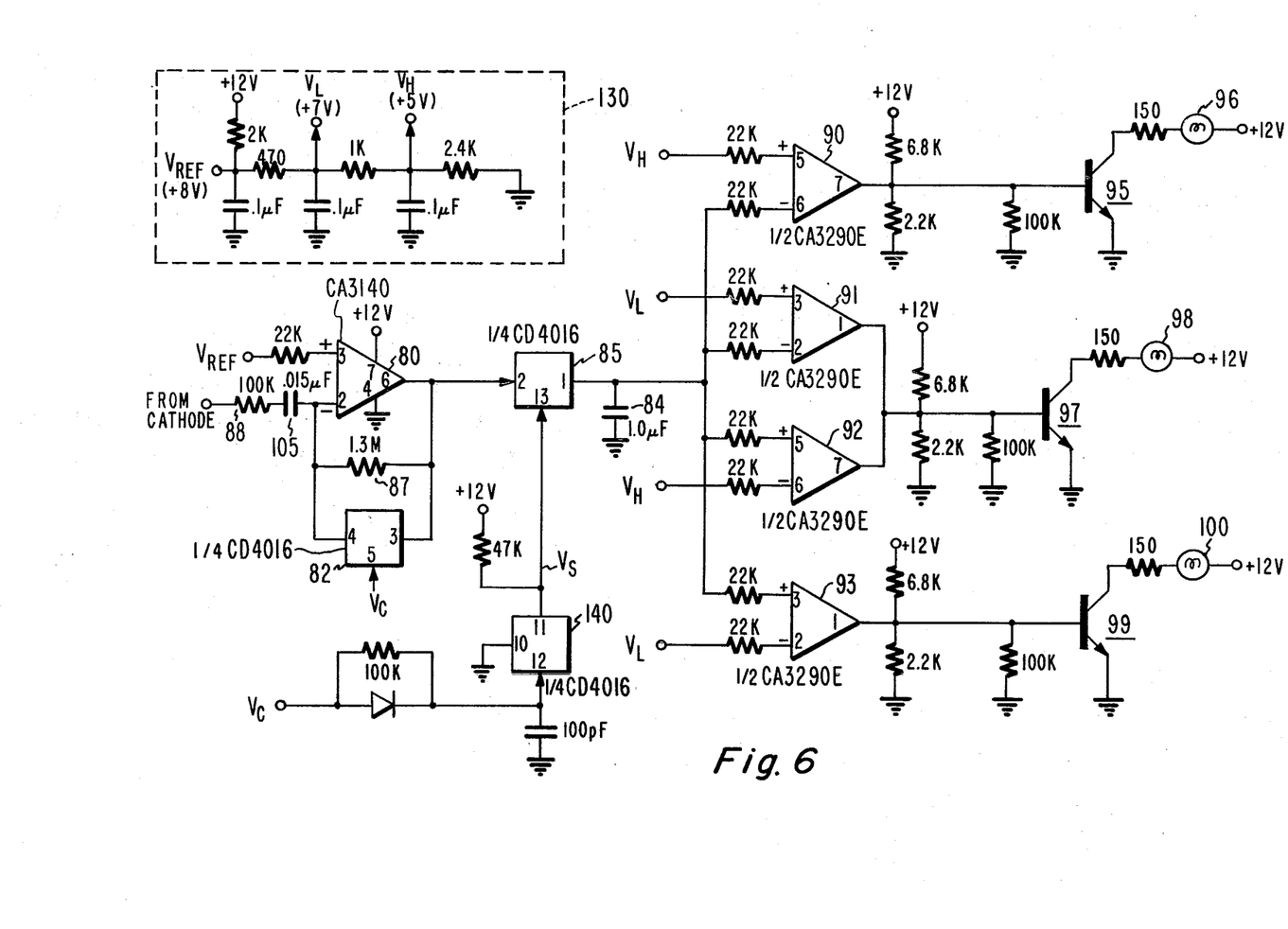
FIG. 6 is a detailed circuit diagram of a portion of the arrangement in FIG. 3.

FIG. 6 shows additional circuit details of sensing circuit 60 and display circuit 62 of unit 55 in FIG. 3, wherein corresponding circuit elements are identified by the same reference number. FIG. 6 additionally shows a voltage divider network 130 for developing reference voltages $V_{REF}$, $V_H$ and $V_L$, and a bilateral switch 140 arranged as a signal inverter. Switch 140 responds to signal $V_C$ for providing sampling signal $V_S$ (a complementary phase version of signal $V_C$) at an output.

What is claimed is:

1. Apparatus for use with a color television receiver including an image reproducing kinescope with an intensity control electron gun having a cathode electrode and an associated grid electrode; deflection means for providing horizontal and vertical scanning control of said kinescope; means for adjusting the bias of said electron gun; a video signal channel for supplying image representative video signals to said kinescope electron gun; and switch means coupled to said video channel and to said deflection means, said switching means having a first position for rendering said video channel and said deflection means normally operative in a normal operating mode of said receiver, and a second position for rendering said video channel inoperative to couple video signals to said kinescope and for rendering said deflection means inoperative to provide vertical deflection scanning of the kinescope in a service operating mode of said receiver when it is desired to adjust the operating characteristics of said kinescope; said apparatus facilitating the adjustment of the blanking current conducted by said electron gun when said receiver is in said service operating mode, and comprising:

means for energizing said kinescope electron gun during periodic monitoring intervals to produce a cathode output signal representative of the current conduction level of said cathode;

sampling means electrically coupled to said cathode electrode for providing a sample of said cathode output signal;

means for comparing said sample with a reference signal to determine the status of said current conduction level of said cathode as being less than, greater than, or substantially equal to a desired current conduction level; and display means coupled to said comparing means for providing a visual indication of said status of said current conduction level.

2. Apparatus according to claim 1, wherein:
    said means for energizing said kinescope electron gun comprises a source of periodic pulses occurring during said monitoring intervals, and means for coupling said pulses to said grid electrode with a sense for forward biasing said grid electrode.

3. Apparatus according to claim 1, wherein:
    said sampling means comprises a sample and hold arrangement including a sampling amplifier and a charge storage device.

4. Apparatus according to claim 3, wherein said sampling means comprises:
    a source of periodic timing signals;
    a sampling switch coupled to said sampling amplifier and to said charge storage device; and
    means for coupling said timing signals to said sampling switch for enabling said sampling switch to couple an output of said amplifier to said charge storage device during said monitoring intervals, and for disabling said sampling switch at times other than said monitoring intervals so that said charge storage device is decoupled from said amplifier output during said other times.

5. Apparatus according to claim 4, wherein:
    said comparing means comprises
    a first comparator responsive to a reference signal and to said sample for providing an output signal when said kinescope current conduction level is less than said desired current conduction level;
    a second comparator responsive to a reference signal and to said sample for providing an output signal when said kinescope current conduction level is substantially equal to said desired current level; and
    a third comparator responsive to a reference signal and to said sample for providing an output signal when said kinescope current conduction level is greater than said desired current level; and wherein said display means comprises
    a first display device subject to energization by said output signal of said first comparator for indicating when said kinescope current level is less than said desired current level;
    a second display device subject to energization by said output signal of said second comparator for indicating when said kinescope current level is substantially equal to said desired current level; and
    a third display device subject to energization by said output signal of said third comparator for indicating when said kinescope current level is greater than said desired current level.

6. Apparatus according to claim 3, wherein said sampling amplifier comprises:
    a signal inverting amplifier with an input coupled to said kinescope cathode electrode, and an output;
    a clamping capacitor coupled to said kinescope cathode electrode and to said amplifier input;
    a source of periodic timing signals;
    a clamping switch coupled in feedback relation between said amplifier output and said clamping capacitor at said amplifier input; and
    means for coupling said timing signals to said clamping switch for enabling said clamping switch to couple said amplifier output to said clamping capacitor at said amplifier input at times other than said monitoring intervals, so that said amplifier input is clamped to the potential than appearing at said amplifier output; and for disabling said clamping switch during said monitoring intervals.

7. Apparatus according to claim 6, wherein:
    said signal inverting amplifier comprises an operational amplifier with a non-inverting input coupled to a source of reference potential, an inverting input coupled to said kinescope cathode electrode and to said clamping capacitor, and an output.

8. Apparatus according to claim 6 and further comprising:
   a sampling switch coupled to said sampling amplifier and to said charge storage device; and
   means for coupling said timing signals to said sampling switch for enabling said sampling switch to couple an output of said amplifier to said charge storage device during said monitoring intervals, and for disabling said sampling switch at times other than said monitoring intervals so that said charge storage device is decoupled from said amplifier output during said other times.

9. Apparatus for use with a color television receiver including an image reproducing kinescope with plural intensity control electron guns each having a cathode electrode and an associated grid electrode; deflection means for providing horizontal and vertical scanning control of said kinescope; means for adjusting the bias of each of said electron guns; a video signal channel for supplying image representative video signals to said kinescope electron guns; and switch means coupled to said video channel and to said deflection means, said switch means having a first position for rendering said video channel and said deflection means normally operative in a normal operating mode of said receiver, and a second position for rendering said video channel inoperative to couple video signals to said kinescope and for rendering said deflection means inoperative to provide vertical deflection scanning of the kinescope in a service operating mode of said receiver when it is desired to adjust the operating characteristics of said kinescope; said apparatus facilitating the adjustment of the blanking current conducted by said electron guns when said receiver is in said service operating mode, and comprising:
   means for energizing said kinescope electron guns during periodic monitoring intervals to produce cathode output signals respectively representative of the current conduction level of each of said cathodes;
   sampling means electrically coupled to each of said cathode electrodes for providing respective samples of each of said cathode output signals;
   means for comparing said respective samples with reference signals to determine the status of the current conduction level of each of said cathodes as being less than, greater than, or substantially equal to a desired current conduction level; and
   display means coupled to said comparing means for providing a visual indication of the status of the current conduction level of each of said cathodes.

10. Apparatus according to claim 9, wherein:
    said electron guns each comprise a cathode electrode and an associated grid electrode energized in common with respect to each of said cathode electrodes.

11. A method of adjusting the blanking current conducted by an electron gun comprising cathode and grid electrodes of a color kinescope in a color television receiver having a video signal channel for supplying video signals to said kinescope, which comprises:
    applying a periodic test signal exclusive of said video signals to said electron gun during periodic monitoring intervals to produce a cathode output signal representative of the current conduction level of said cathode;
    sampling said cathode output signal;
    comparing said sample with a reference signal to provide plural signals indicating the status of said cathode current conduction level as being less than, greater than, or substantially equal to a desired current conduction level, respectively;
    displaying a visual indication of said status of said current conduction level as indicated by said indicating signals; and
    adjusting the bias of said kinescope until a visual indication corresponding to the desired current conduction level is obtained.

12. A method of individually adjusting the blanking current conducted by plural electron guns each comprising cathode and grid electrodes of a color kinescope in a color television receiver having a video signal channel for coupling video signals to said kinescope, which comprises the steps of:
    A. applying a periodic test signal exclusive of said video signals to one of said electron guns during periodic monitoring intervals to produce a cathode output signal representative of the current conduction level of the cathode associated with said one electron gun;
    B. sampling said cathode output signal;
    C. comparing said sample with reference signals to provide plural signals indicating the status of said cathode current conduction level as being less than, greater than, or substantially equal to a desired current conduction level, respectively;
    D. displaying a visual indication of said status of said current conduction level as indicated by said indicating signals;
    E. adjusting the bias of said kinescope until a visual indication corresponding to the desired output conduction level is obtained; and
    F. repeating steps (A) through (E) for the other electron guns of said kinescope.

13. A method according to claim 12 for use with a color television receiver comprising a kinescope with plural electron guns each having a cathode electrode and an associated grid electrode energized in common with respect to each of said cathode electrodes, wherein step (A) comprises:
    applying a periodic pulse to said common grid electrode during said monitoring intervals.

14. A method according to claim 12, wherein step (D) comprises:
    connecting said indicating signals to light emitting display devices for displaying said visual indication.

15. A method according to claim 14, wherein the connecting step comprises:
    connecting one of said plural indicating signals to a first light emitting display device, for energizing said first display device when said cathode current level is less than the desired current level;
    connecting another of said indicating signals to a second light emitting display device, for energizing said second display device when said cathode current level is greater than the desired current level; and
    connecting a further of said indicating signals to a third light emitting display device, for energizing said third display device when said cathode current level is substantially equal to the desired current level.

* * * * *